(12) United States Patent
Onodera

(10) Patent No.: US 7,086,292 B2
(45) Date of Patent: Aug. 8, 2006

(54) FORCE-FEEDBACK INPUT DEVICE

(75) Inventor: Mikio Onodera, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 40 days.

(21) Appl. No.: 10/893,441

(22) Filed: Jul. 16, 2004

(65) Prior Publication Data
US 2005/0016294 A1    Jan. 27, 2005

(30) Foreign Application Priority Data
Jul. 24, 2003    (JP) .............................. 2003-201120

(51) Int. Cl.
*G01B 5/30*    (2006.01)
(52) U.S. Cl. ........................................... 73/780
(58) Field of Classification Search .................. 73/780
See application file for complete search history.

(56) References Cited

U.S. PATENT DOCUMENTS

| | | | |
|---|---|---|---|
| 6,128,006 A | 10/2000 | Rosenberg et al. | |
| 6,194,673 B1 * | 2/2001 | Sato et al. | 200/4 |
| 6,218,635 B1 * | 4/2001 | Shigemoto et al. | 200/570 |
| 6,283,859 B1 * | 9/2001 | Carlson et al. | 463/36 |
| 6,388,212 B1 * | 5/2002 | Ishihara et al. | 200/18 |
| 6,809,275 B1 * | 10/2004 | Cheng et al. | 200/14 |
| 6,953,901 B1 * | 10/2005 | Onodera | 200/6 A |
| 2001/0019324 A1 * | 9/2001 | Rosenberg | 345/156 |
| 2004/0231434 A1 * | 11/2004 | Shibazaki et al. | 73/862.08 |

FOREIGN PATENT DOCUMENTS

JP    2003-50639    2/2003

* cited by examiner

*Primary Examiner*—Max Noori
(74) *Attorney, Agent, or Firm*—Brinks Hofer Gilson & Lione

(57) ABSTRACT

A force-feedback input device includes a rotatable operating member; a motor which is capable of applying torque to the operating member; a rotary encoder for detecting the rotational angle of the operating member; and a controller for controlling the motor based on the detected rotational angle. The operating member is tubular and is housed in a housing such that the periphery of the operating member is partially uncovered and exposed through an opening provided in the operating surface of the housing. An output shaft of the motor is concentrically fixed to operating member, and the main body of the motor is disposed in the tubular operating member.

23 Claims, 7 Drawing Sheets

FORCE-FEEDBACK INPUT DEVICE

This application claims the benefit of priority to Japanese Patent Application No. 2003-201120, herein incorporated by reference.

BACKGROUND OF THE INVENTION

1. Field of the Invention

The present invention relates to input devices for operating electric units, such as in-vehicle electric units, by rotating an operating member. In particular, the present invention relates to a force-feedback input device that applies torque to the operating member in an amount corresponding to the rotational angle of the operating member so that a certain operational feel, namely, force feedback, is imparted to an operator via the operating member.

2. Description of the Related Art

A typical force-feedback input device is generally provided with a rotatable knob disposed in a housing; a rotary encoder for detecting the rotational angle of the knob; a motor, which is capable of applying torque to the knob; and a controller, which controls the motor and also outputs a command signal to an electric unit subject to operation, based on the rotational angle of the knob detected by the rotary encoder.

Such a force-feedback input device is intended for outputting a command signal to an electric unit such as an in-vehicle electric unit, and this output of a command signal is implemented by rotating the knob. For example, such a force-feedback input device can be used for an airflow adjustment or a nozzle control of an in-vehicle air conditioner, for volume control or tuning control in a radio unit, and for volume control or tone control in an audio unit.

For example, for adjusting the airflow of an in-vehicle air conditioner, when the knob is rotated in a direction for raising the airflow level, the motor applies torque to the knob in a direction opposite to the rotation of the knob. Moreover, as the rotational angle of the knob rotating in the airflow-increasing direction increases, the torque applied in the opposite direction also increases. Accordingly, an operator is able to sense how much he/she has rotated the knob in the airflow-increasing direction from an operational feel (force feedback) produced by the increasing resistive force imparted to the knob.

In addition to a force-feedback input device of this type that imparts an operational feel to an operator with resistive force, there are other types of force-feedback input devices. One of the types, for example, applies torque in the same direction as the rotation of the knob to impart an accelerative force as an operational feel. Another type inverts the direction of the torque applied to the knob when the rotational angle of the knob exceeds a predetermined angle so as to impart a feel of a "click" to the operator.

Japanese Unexamined Patent Application Publication No. 2003-50639 discloses an example of a force-feedback input device.

There are problems in the conventional force-feedback input devices in view of size reduction. For manipulating the knob (operating member) in the conventional force-feedback input devices, the knob is held with two or more fingers, and this allows a great operating force to be applied to the knob. To generate an operational feel with, for example, resistive force in a state where such a great operating force is applied to the knob, a motor that is capable of outputting torque that corresponds to the operating force is required. This implies that a motor with a large dimension is required. In other words, the necessity of a large motor in the conventional force-feedback input devices is one of the reasons that causes difficulty in view of size reduction.

SUMMARY OF THE INVENTION

Accordingly, it is an object of the present invention to provide a force-feedback input device that allows use of a motor having a small dimension.

A force-feedback input device according to the present invention includes a housing having an operating surface provided with an opening; an operating member whose periphery has an arc-shaped cross section and which is rotatable about its rotational axis in the circumference direction of the arc; a motor which is capable of applying torque to the operating member; a rotational-angle detector for detecting the rotational angle of the operating member; and a controller for controlling the motor based on the rotational angle detected by the rotational-angle detector. The operating member is housed in the housing such that the periphery of the operating member is partially uncovered and exposed through the opening of the operating surface. Thus, the operating member is rotatable about its rotational axis by manipulating the uncovered part of the periphery.

Accordingly, the operating member can be manipulated by moving the uncovered part of the periphery with the tip of a finger. Consequently, a less operating force is required for the operating member, thus allowing use of a small motor since only a small amount of torque is required for rotating the operating member.

Furthermore, according to the present invention, the operating member is preferably tubular and at least a portion of the main body of the motor is preferably disposed in the tubular operating member.

Furthermore, according to the present invention, the force-feedback input device may further include a rotary supporter which is disposed in the housing and tiltably supports the motor such that the motor can be tilted towards the opening of the operating surface; a switch disposed adjacent to the operating member across from the operating surface such that the switch faces the operating member, the switch being operated via the operating member when the operating member is tilted toward the housing; and a biasing element which constantly biases the operating member towards the exterior of the housing.

Furthermore, according to the present invention, the rotary supporter may include a base which is fixed to the housing and is disposed adjacent to the operating member across from the operating surface such that the base faces the operating member, and a holder for supporting the motor. The base may be provided with first rotary supporting portions and the holder may be provided with second rotary supporting portions. The first rotary supporting portions may be disposed adjacent to two opposite sides of the operating member, and the second rotary supporting portions may similarly be disposed adjacent to two opposite sides of the operating member. The second rotary supporting portions may be supported by the first rotary supporting portions in a tiltable manner, whereby the holder is tiltably supported by the base.

Furthermore, according to the present invention, the operating member may be disposed between the first rotary supporting portions such that the first rotary supporting portions are aligned with the center line of the operating member extending perpendicular to the rotational axis, and the operating member may be disposed between the second rotary supporting portions such that the second rotary supporting portions are also aligned with the center line of the operating member. Moreover, the present invention may be provided with a plurality of switches, which are disposed adjacent to two opposite ends of the operating member along the rotational-axis direction of the operating member.

Furthermore, according to the present invention, the biasing element may be included in each of the switches. Each switch may be provided with an operating portion which is operated when the operating portion is pressed by the operating member. Moreover, each switch may include a resilient member for allowing the pressed operating portion to return automatically to its original state. In this case, the resilient member functions as the biasing element.

DESCRIPTION OF THE PREFERRED EMBODIMENTS

Embodiments of a force-feedback input device according to the present invention will be described below.

First Embodiment

A first embodiment will now be described with reference to FIGS. 1 to 6.

Figure 1:
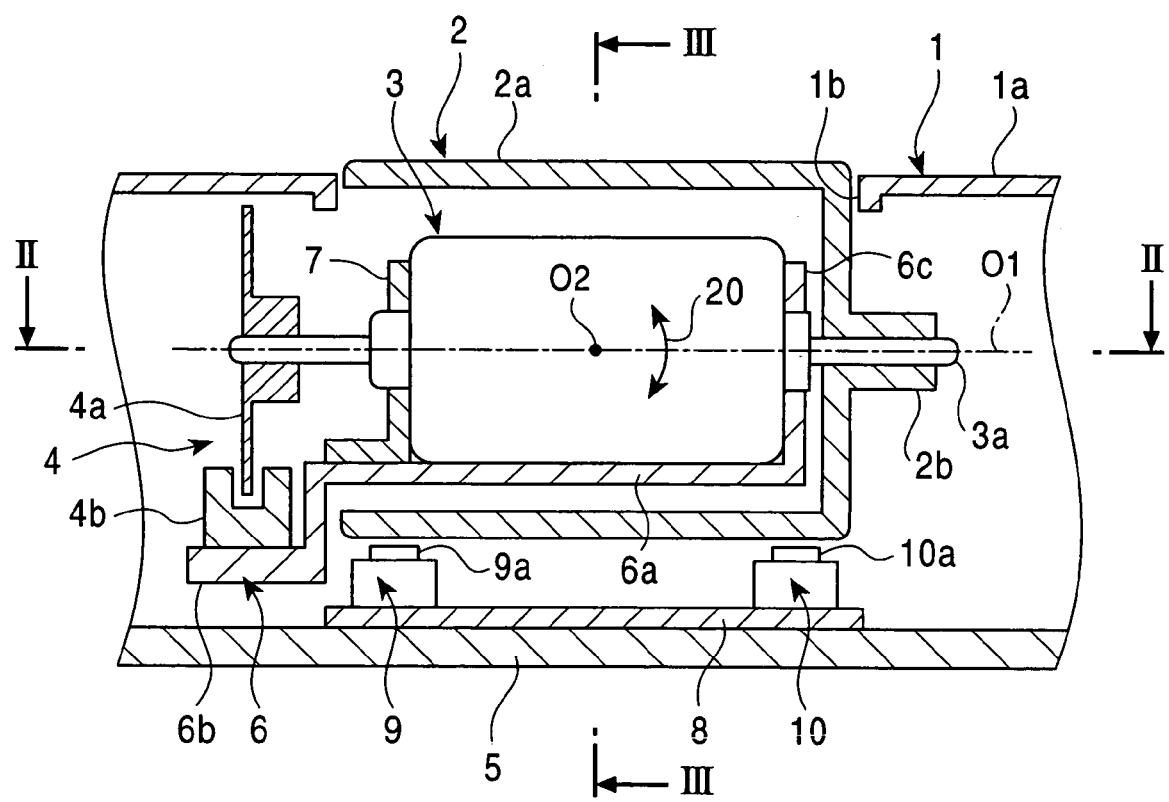
FIG. 1 is a cross-sectional view illustrating the structure of a force-feedback input device according to a first embodiment of the present invention.
Figure 2:
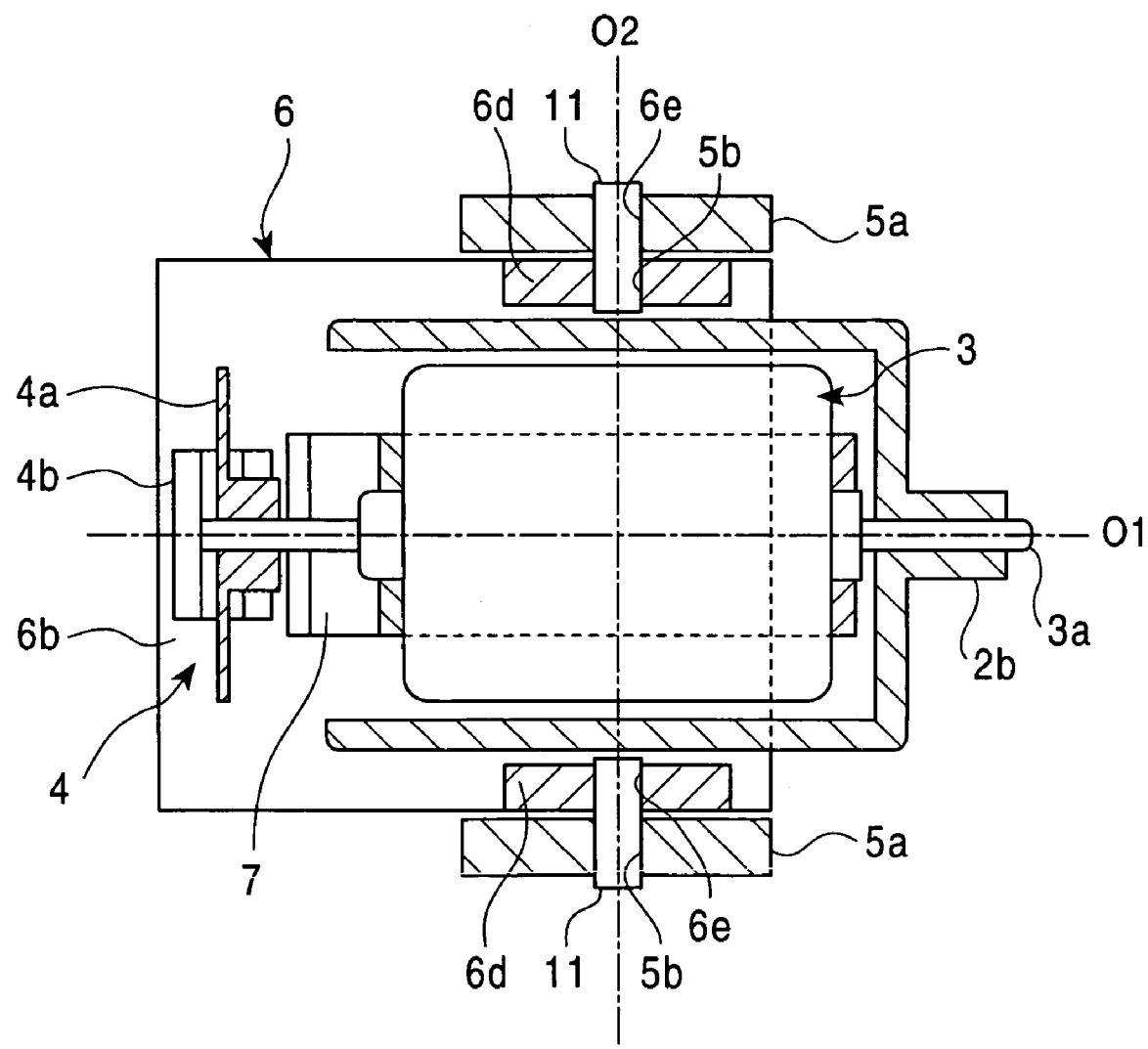
FIG. 2 is a cross-sectional view taken along line II—II in FIG. 1.
Figure 3:
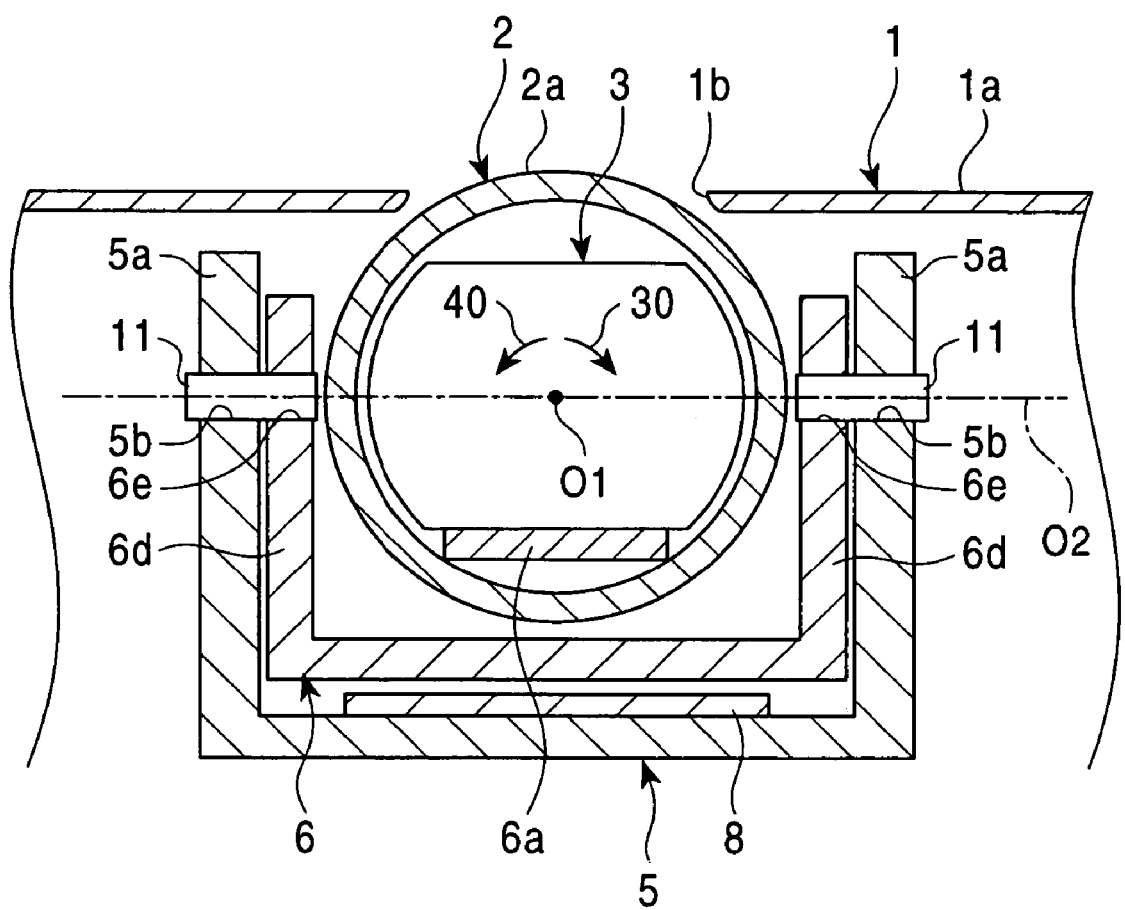
FIG. 3 is a cross-sectional view taken along line III—III in FIG. 1.
Figure 4:
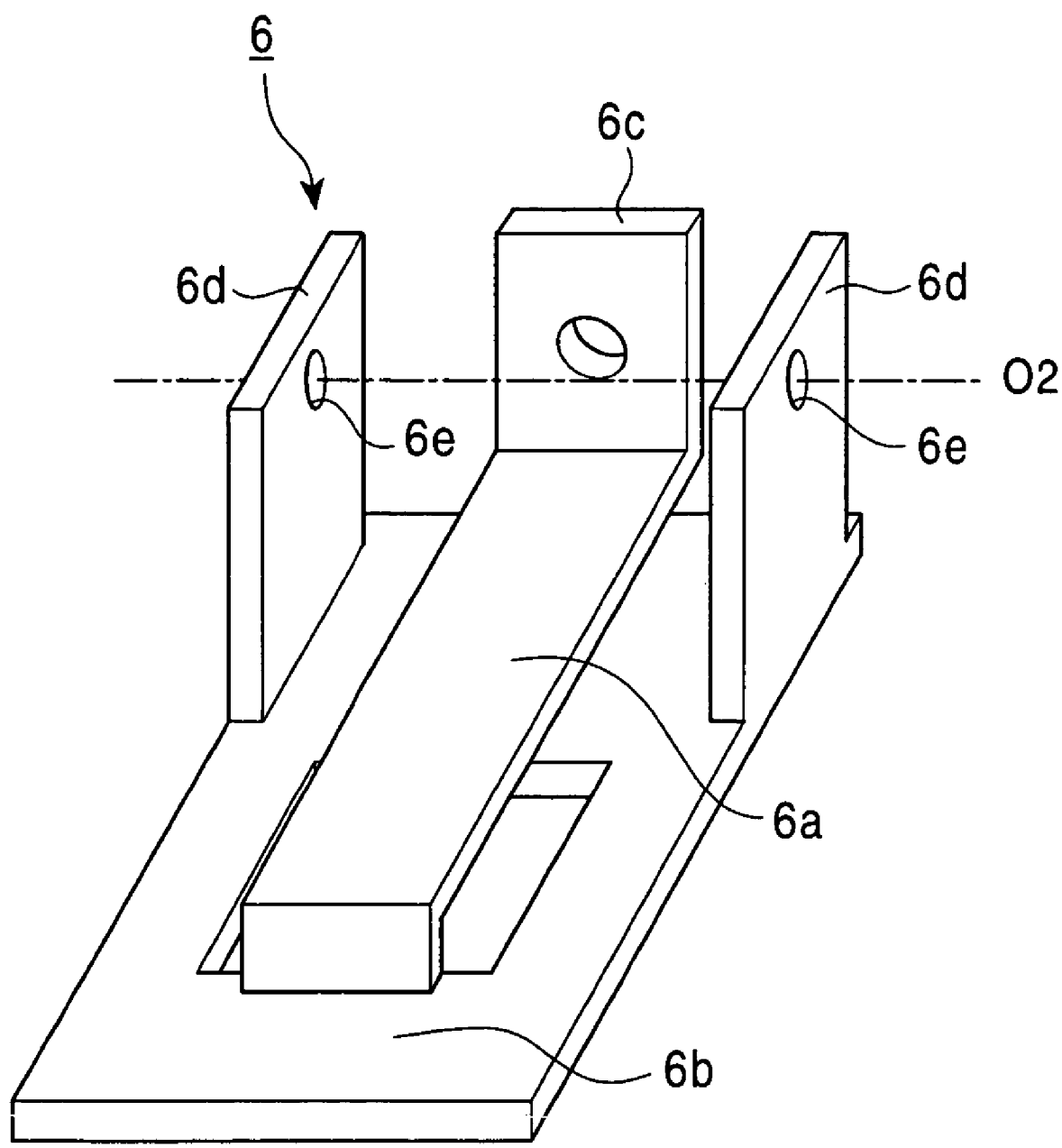
FIG. 4 is a perspective view of a holder included in the force-feedback input device of the first embodiment.
Figure 5:
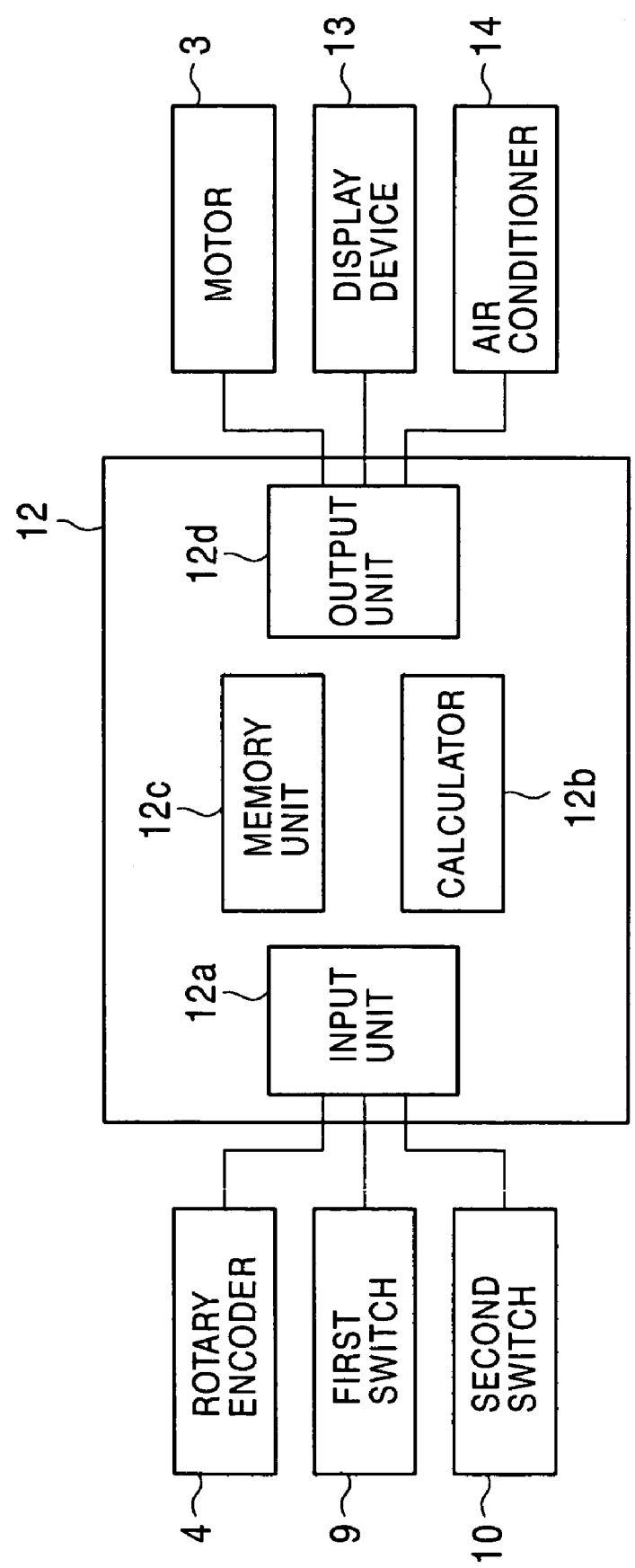
FIG. 5 is a block diagram illustrating an electric system, which includes a controller provided in the force-feedback input device according to the first embodiment.
Figure 6:
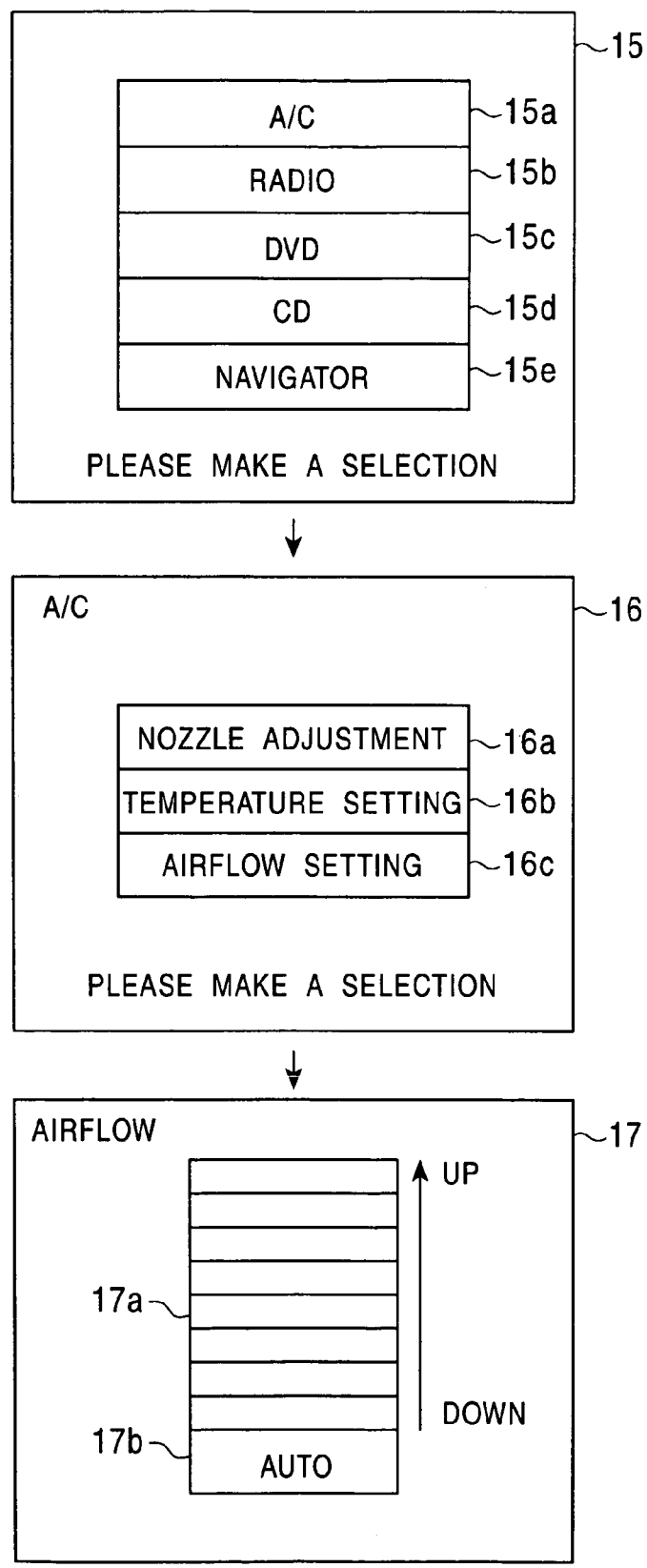
FIG. 6 illustrates display screens of a display device shown in FIG. 5.

FIG. 1 is a cross-sectional view illustrating the structure of the force-feedback input device according to the first embodiment. FIG. 2 is a cross-sectional view taken along line II—II in FIG. 1. FIG. 3 is a cross-sectional view taken along line III—III in FIG. 1. FIG. 4 is a perspective view illustrating a holder 6 provided in the force-feedback input device according to the first embodiment. FIG. 5 is a block diagram illustrating an electric system, which includes a controller 12, according to the first embodiment. FIG. 6 illustrates display screens of a display device 13 illustrated in FIG. 5.

The force-feedback input device of the first embodiment is used for operating an electric unit, such as an in-vehicle electric unit, and is disposed on, for example, an instrumental panel installed in a vehicle. The instrumental panel is not shown in the drawings. The force-feedback input device of the first embodiment has the structure shown in FIGS. 1 to 5.

Referring to FIGS. 1 to 3, the force-feedback input device includes a housing 1; an operating member 2 (wheel) having, for example, a tubular shape such that the cross section of the periphery 2a of the operating member 2 taken along line II—II is arc-shaped; and a motor 3 which is capable of applying torque to the operating member 2. The housing 1 has an operating surface 1a, which is provided with an opening 1b. The operating member 2 is housed inside the housing 1 such that the periphery 2a is partially uncovered and exposed through the opening 1b of the operating surface 1a. The operating member 2 houses the main body of the motor 3. The motor 3 has an output shaft 3a whose second end is fixed to the operating member 2 such that the output shaft 3a, is concentric with the operating member 2. Specifically, the operating member 2 has a boss portion 2b whose center is aligned with the axis line of the operating member 2, i.e. a rotational axis O1, and the second end of the output shaft 3a is engaged with the boss portion 2b.

The force-feedback input device further includes a rotary encoder 4, i.e. a rotational-angle detector, for detecting the rotational angle of the operating member 2. The rotary encoder 4 is fixed to a first end of the output shaft 3a of the motor 3. The rotary encoder 4 is provided with a code-disc 4a, which includes codes corresponding to the rotational angle of the output shaft 3a, i.e. the rotational angle of the operating member 2; and a photo-interrupter 4b for outputting a rotation signal corresponding to the rotational angle of the operating member 2 based on a code from the code-disc 4a. The photo-interrupter 4b is connected to the controller 12, which will be described later, and outputs the rotation signal to the controller 12.

The motor 3 is attached to the holder 6. Referring to FIG. 4, the holder 6 has a holding portion 6a for supporting the main body of the motor 3; a vertical portion 6c having an opening through which the output shaft 3a of the motor 3 extends; and a base portion 6b for supporting the photo-interrupter 4b.

Referring to FIG. 1, a supporting member 7 is fixed to the holding portion 6a of the holder 6, and the first end of the output shaft 3a extends through the supporting member 7 so that the main body of the motor 3 is disposed between the vertical portion 6c and the supporting member 7.

Furthermore, in the first embodiment, the force-feedback input device is provided with a rotary supporter, which tiltably supports the motor 3 such that the motor 3 can be tilted towards the opening 1b of the operating surface 1a, namely, with respect to a tilting axis O2 shown in FIGS. 1 and 2.

Referring to FIGS. 2 and 3, the rotary supporter includes a base 5, which is fixed to the housing 1; and the holder 6, which is tiltably supported by the base 5. In detail, the base 5 is provided with a pair of first rotary supporting portions 5a at two opposite sides of the base 5. The first rotary supporting portions 5a are disposed adjacent to two opposite sides of the periphery 2a of the operating member 2, and each of the first rotary supporting portions 5a has a hole 5b with which one of rotary shafts 11 engages. On the other hand, the base portion 6b is provided with a pair of second rotary supporting portions 6d at two opposite sides of the base portion 6b. Each of the second rotary supporting portions 6d is disposed between one of the first rotary supporting portions 5a and the operating member 2 and is provided with a shaft hole 6e in which the corresponding rotary shaft 11 is held in a rotatable manner. Consequently, the combination of the operating member 2, the motor 3, the rotary encoder 4, and the holder 6 is tiltable above the base 5 with respect to the rotary shafts 11 acting as a fulcrum. In other words, the combination can rotate around the tilting axis O2 in the direction indicated by an arrow 20 shown in FIG. 1.

Furthermore, the surface of the base 5 adjacent to the operating member 2 is provided with a printed substrate 8. A first switch 9 and a second switch 10 are disposed on the printed substrate 8.

The first switch 9 is a button-type switch provided with an operating portion 9a and is turned on when the operating portion 9a is pressed. The first switch 9 includes a resilient member, which is not shown in the drawings, for allowing the pressed operating portion 9a to return automatically to its original state. The first switch 9 is disposed in a position where the operating portion 9a can come into contact with a first side of the periphery 2a of the operating member 2, namely, a side of the periphery 2a adjacent to the rotary encoder 4. Consequently, when the first side is pressed into the housing 1 such that the operating member 2 is tilted, the first side of the periphery 2a presses against the operating portion 9a to turn on the first switch 9. The first switch 9 is connected to the controller 12 and outputs an ON signal to the controller 12.

Similarly, the second switch 10 is also a button-type switch provided with an operating portion 10a and is turned on when the operating portion 10a is pressed. The second switch 10 also includes a resilient member, which is not shown in the drawings, for allowing the pressed operating portion 10a to return automatically to its original state. The second switch 10 is disposed in a position where the operating portion 10a can come into contact with a second side of the periphery 2a of the operating member 2, namely, a side of the periphery 2a adjacent to the boss portion 2b. Consequently, when the second side is pressed into the housing 1 such that the operating member 2 is tilted, the second side of the periphery 2a presses against the operating portion 10a to turn on the second switch 10. The second switch 10 is connected to the controller 12 and outputs an ON signal to the controller 12.

Referring to FIG. 5, the force-feedback input device of the first embodiment includes the controller 12. The controller 12 is connected to the motor 3, the display device 13, which is installed in a vehicle, and electric units subject to operation by the operating member 2. Since an airflow adjustment for an air conditioner will be described later as an example of the operation of the first embodiment, FIG. 5 illustrates an air conditioner 14 as one of the electric units subject to operation.

The controller 12 includes an input unit 12a for receiving a rotation signal from the rotary encoder 4, an ON signal from the first switch 9, and an ON signal from the second switch 10; a calculator 12b for calculating values corresponding to signals subject to be output to the motor 3 and to electric units such as the display device 13 and the air conditioner 14; an output unit 12d for outputting signals to the motor 3 and to electric units such as the display device 13 and the air conditioner 14, based on the calculation by the calculator 12b; and a memory unit 12c in which mathematical functions for the calculation in the calculator 12b and a control program for operating the controller 12 are pre-stored.

The signals output from the output unit 12d include a driving signal for driving the motor 3; a first display-switching signal, which corresponds to the ON signal from the first switch 9 and is for switching the current screen on the display device 13 to a subsequent screen; a second display-switching signal, which corresponds to the ON signal from the second switch 10 and is for switching the current screen on the display device 13 to a previous screen; and a command signal for sending a command, which corresponds to the rotational angle of the operating member 2, to an electric unit such as the display device 13.

The mathematical functions pre-stored in the memory unit 12c include a mathematical function for calculating a value corresponding to a driving signal; a mathematical function for determining whether to output a first display-switching signal when an ON signal is received from the first switch 9; a mathematical function for determining whether to output a second display-switching signal when an ON signal is received from the second switch 10; and a mathematical function for calculating a value corresponding to a command signal subject to be output to an electric unit such as the display device 13.

The operation according to the first embodiment will now be described.

For example, referring to FIG. 6, the display device 13 displays a first menu screen 15 for allowing an operator to choose whichever one of electric units the operator desires to operate. The first menu screen 15 displays selectable items, which includes, for example, A/C 15a corresponding to the air conditioner 14, radio 15b corresponding to a radio unit, DVD 15c corresponding to a DVD player, CD 15d corresponding to a CD player, and navigator 15e corresponding to a car navigation system.

An operator may rotate the operating member 2 around the rotational axis O1 in this state where the first menu screen 15 is being displayed. In detail, the operator may rotate the operating member 2 using his/her finger to move the uncovered part of the periphery 2a exposed through the opening 1b. Accordingly, when the operating member 2 is rotated, the rotary encoder 4 detects the rotational angle of the operating member 2, and the corresponding rotation signal is input to the input unit 12a of the controller 12. The calculator 12b then calculates a value corresponding to a command signal subject to be output to the display device 13. A command signal corresponding to the calculated value is sent to the display device 13 from the output unit 12d. The display device 13 operates in response to the command signal and thus changes the color of one of the selectable items in a position corresponding to the rotational angle of the operating member 2 so as to highlight the item.

When the item desired by the operator, such as A/C 15a, is highlighted, the operator may press against one of the sides of the operating member 2 adjacent to the rotary encoder 4, which will be referred to as the first side, to make a selection for A/C 15a. Specifically, in a state where the rotational angle of the operating member 2 corresponding to the position of A/C 15a is maintained, the first side of the operating member 2 is pressed into the housing 1 such that the operating member 2 is tilted with respect to the tilting axis O2. Thus, the first side of the periphery 2a of the operating member 2 presses the operating portion 9a of the first switch 9. Accordingly, an ON signal is sent to the input unit 12a of the controller 12 from the first switch 9. The calculator 12b then determines an output for a first display-switching signal so as to allow the output unit 12d to output a first display-switching signal to the display device 13.

The display device 13 operates in response to the first display-switching signal and thus switches the first menu screen 15, i.e. the current screen displayed in the display device 13, to a second menu screen 16, i.e. a subsequent screen. The second menu screen 16 allows an operator to choose whichever one of functions provided in the air conditioner 14 the operator desires to operate. The second menu screen 16 displays selectable items, which include nozzle adjustment 16a, temperature setting 16b, and airflow setting 16c.

The operator may rotate the operating member 2 around the rotational axis O1 in this state where the second menu screen 16 is being displayed. The rotary encoder 4 detects the rotational angle of the operating member 2, and the corresponding rotation signal is input to the input unit 12a of the controller 12. The calculator 12b then calculates a value corresponding to a command signal subject to be output to the display device 13. A command signal corresponding to the calculated value is sent to the display device 13 from the output unit 12d. The display device 13 operates in response to the command signal and thus changes the color of one of the selectable items in a position corresponding to the rotational angle of the operating member 2 so as to highlight the item.

When the item desired by the operator, such as airflow setting 16c, is highlighted, the operator may press against the first side of the operating member 2 to make a selection for airflow setting 16c. Specifically, in a state where the rotational angle of the operating member 2 corresponding to the position of airflow setting 16c is maintained, the first side of the operating member 2 is pressed into the housing 1 such that the operating member 2 is tilted with respect to the tilting axis O2. Thus, the first side of the periphery 2a of the operating member 2 presses the operating portion 9a of the first switch 9. Accordingly, an ON signal is sent to the input unit 12a of the controller 12 from the first switch 9. The calculator 12b then determines an output for a first display-switching signal so as to allow the output unit 12d to output a first display-switching signal to the display device 13.

The display device 13 operates in response to the first display-switching signal and thus switches the second menu screen 16, i.e. the current screen displayed in the display device 13, to a third menu screen 17, i.e. a subsequent screen. The third menu screen 17 displays level bars 17a indicating multiple airflow levels, and AUTO 17b for an automatic airflow adjustment based on the set temperature.

In this state where the third menu screen 17 is being displayed, the operator may rotate the operating member 2 to select AUTO 17b or to adjust the level bars 17a to the desired airflow level.

Specifically, for raising the airflow level, the operating member 2 is rotated in, for example, a direction indicated by an arrow 30 shown in FIG. 3. On the other hand, for lowering the airflow level or for selecting AUTO 17b, the operating member 2 is rotated in a direction indicated by an arrow 40 in FIG. 3. Accordingly, when the operating member 2 is rotated, the rotary encoder 4 detects the rotational angle of the operating member 2, and the corresponding rotation signal is input to the input unit 12a of the controller 12. The calculator 12b then calculates a value corresponding to a command signal subject to be output to the display device 13. A command signal corresponding to the calculated value is sent to the display device 13 from the output unit 12d. The display device 13 operates in response to the command signal and thus highlights AUTO 17b or one of the level bars 17a in a position corresponding to the rotational angle of the operating member 2.

When AUTO 17b or the desired one of the level bars 17a is highlighted, the operator may press against the first side of the operating member 2 to make a selection for AUTO 17b or the corresponding highlighted level bar 17a. Specifically, in a state where the rotational angle of the operating member 2 corresponding to the position of the desired level bar 17a or to the position of AUTO 17b is maintained, the first side of the operating member 2 is pressed into the housing 1 such that the operating member 2 is tilted with respect to the tilting axis O2. Thus, the first side of the periphery 2a of the operating member 2 presses the operating portion 9a of the first switch 9. Accordingly, an ON signal is sent to the input unit 12a of the controller 12 from the first switch 9. The calculator 12b then determines an output for a first display-switching signal so as to allow the output unit 12d to output a first display-switching signal to the display device 13. Thus, the airflow setting process is completed, and the current screen displayed in the display device 13 is switched back to the first menu screen 15.

In addition, while the operating member 2 is being operated by the operator for the airflow setting, the calculator 12b calculates a value corresponding to a driving signal for the motor 3. A driving signal corresponding to the calculated value is then output to the motor 3 from the output unit 12d. The motor 3 operates in response to the driving signal and thus imparts torque to the operating member 2. For example, if the operating member 2 is rotated in a direction for raising the airflow level, namely, the direction indicated by the arrow 30 in FIG. 3, the torque is applied in the opposite direction of the rotation of the operating member 2, namely, the direction indicated by the arrow 40. In this case, the torque becomes greater as the operating member 2 is rotated further in the direction for raising the airflow level. In other words, in addition to watching the level bars 17a, the operator can sense how much he/she has rotated the operating member 2 in the direction for raising the airflow level from an operational feel (force feedback) produced by the increasing resistive force imparted to the operating member 2.

On the other hand, when a second side of the operating member 2, opposite to the first side, is pressed in a state where the second menu screen 16 or the third menu screen 17 is being displayed in the display device 13, the second side of the periphery 2a of the operating member 2 presses the operating portion 10a of the second switch 10. Accordingly, an ON signal is sent to the input unit 12a of the controller 12 from the second switch 10. The calculator 12b then determines an output for a second display-switching signal so as to allow the output unit 12d to output a second display-switching signal to the display device 13. The display device 13 operates in response to the second display-switching signal and thus switches the second menu screen 16 to the first menu screen 15, or the third menu screen 17 to the second menu screen 16.

The first embodiment has the following advantages.

Since the operating member 2 is housed in the housing 1 such that the periphery 2a is partially uncovered and exposed through the opening 1b of the operating surface 1a, the operating member 2 can be manipulated by moving the uncovered part of the periphery 2a with the tip of a finger. Consequently, a less operating force is required for the operating member 2, thus allowing use of a small motor 3 since only a small amount of torque is required for rotating the operating member 2. According to the first embodiment, the use of a small motor 3 contributes to the size reduction of the force-feedback input device.

Furthermore, since the first switch 9 and the second switch 10 can both be operated by pressing the operating member 2, in addition to the output of a signal corresponding to the rotation of the operating member 2, the force-feedback input device of first embodiment can output a signal corresponding to the pressing of the operating member 2 against one side of the operating member 2 and a signal corresponding to the pressing of the operating member 2 against the other side. Accordingly, a force-feedback input device having three input functions is provided.

Furthermore, the resilient member included in each of the first switch 9 and the second switch 10 acts a biasing element for the operating member 2. In other words, since each of the first switch 9 and the second switch 10 is provided with a biasing element, additional biasing elements are not necessary. Accordingly, this reduces the number of required components.

As described previously, the first embodiment is provided with the two switches, i.e. the first switch 9 and the second switch 10, and the two switches 9 and 10 can be operated by tilting the operating member 2 with respect to a fulcrum, which is provided along the axis line of the operating member 2 and is substantially in the center of the operating member 2. However, the present invention is not limited to such a structure. For example, the present invention may alternatively be provided with only the second switch 10 such that the second switch 10 may be operated by tilting the operating member 2 with respect to a fulcrum provided along the axis line of the operating member 2 and positioned closer to the first side of the operating member 2. In contrast, the present invention may alternatively be provided with only the first switch 9 such that the first switch 9 may be operated by tilting the operating member 2 with respect to a fulcrum provided along the axis line of the operating member 2 and positioned closer to the second side of the operating member 2. Alternatively, the present invention does not necessary have to include the first switch 9 and the second switch 10, and in that case, the tilting mechanism of the operating member 2 is not used.

Furthermore, in the first embodiment, although the first switch 9 and the second switch 10 are provided with biasing elements for biasing the operating member 2 so that the operating member 2 can automatically return to its original state, the present invention is not limited to such a structure. Alternatively, additional biasing elements may be provided separate from the first switch 9 and the second switch 10.

Furthermore, although the force-feedback input device according to the first embodiment is disposed on an instrumental panel, the present invention is not limited to such a structure. Alternatively, like the second embodiment of the present invention, which will be described below, the force-feedback input device of the first embodiment may be installed in the spoke portion of a steering wheel so as to allow a driver to operate an in-vehicle electric unit while holding the ring portion of the steering wheel.

Second Embodiment

A second embodiment according to the present invention will now be described with reference to FIGS. 7A, 7B, and 8.

Figure 7A:
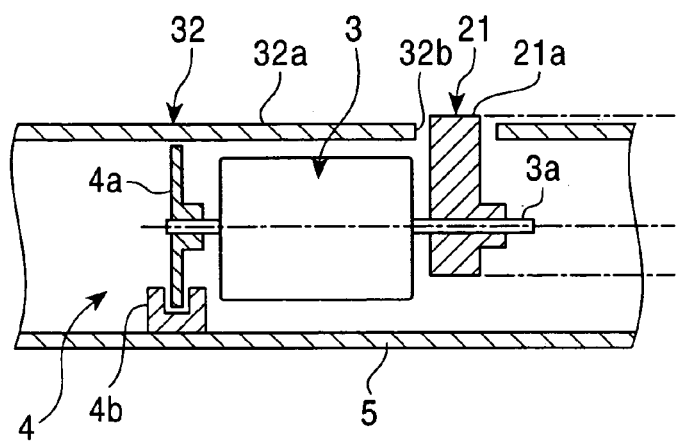
FIG. 7A is a cross-sectional view of a force-feedback input device according to a second embodiment of the present invention.
Figure 7B:
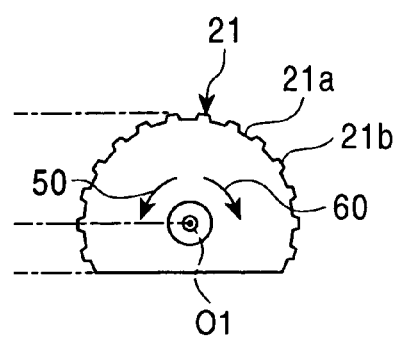
FIG. 7B is a front view of an operating member provided in the force-feedback input device of the second embodiment.

FIGS. 7A and 7B illustrate the structure of the force-feedback input device according to the second embodiment. FIG. 7A is a cross-sectional view of the force-feedback input device of the second embodiment, and FIG. 7B is a front view of an operating member 21 included in the force-feedback input device of the second embodiment. FIG. 8 is a plan view of a steering wheel 30 provided with the force-feedback input device of the second embodiment. Here, components in FIGS. 7A and 7B similar to those in FIG. 1 are indicated by the same reference numerals.

The force-feedback input device of the second embodiment includes the operating member 21 having a periphery 21a whose cross section is arc-shaped. The operating member 21 is rotatable in the circumference direction of the arc with respect to the rotational axis O1. The force-feedback input device further includes the motor 3, which is capable of applying torque to the operating member 21; the rotary encoder 4 for detecting the rotational angle of the operating member 21; and the controller 12 for controlling the motor 3 based on the rotational angle detected by the rotary encoder 4.

One of the ends of the output shaft 3a of the motor 3 is fixed to the operating member 21 such that the output shaft 3a is concentric with the operating member 21. Referring to FIG. 7B, the symmetrical state of the operating member 21 is set as a neutral position in which the rotational angle is 0°. When the operating member 21 is rotated in a direction indicated by an arrow 50 or in a direction indicated by an arrow 60 from the neutral position, the controller 12 controls the motor 3 to torque the operating member 21 towards the neutral position. Specifically, when the operating force is released from the operating member 21 after the operating member 21 is rotated, the operating member 21 automatically returns to the neutral position.

Figure 8:
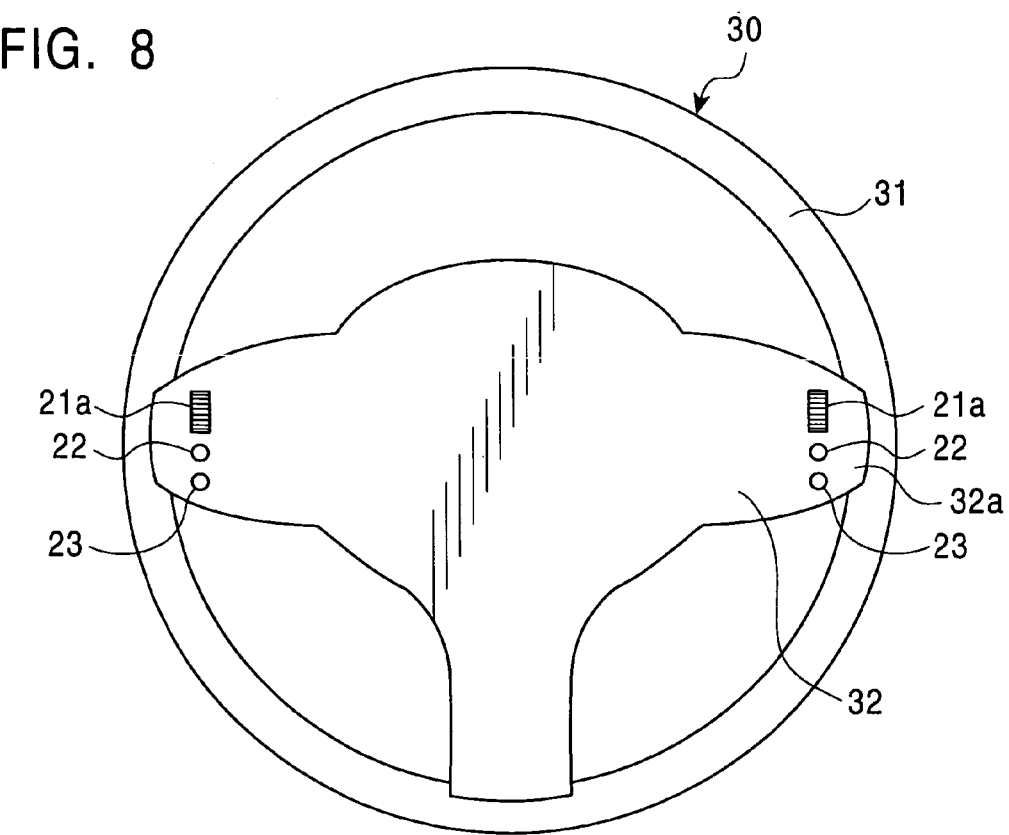
FIG. 8 is a plan view of a steering wheel provided with the force-feedback input device of the second embodiment.

FIG. 8 illustrates two of the force-feedback input devices according to the second embodiment, which are provided in a spoke portion 32 of the steering wheel 30. In the second embodiment, the spoke portion 32 functions as a housing. Each operating member 21 is housed in the spoke portion 32 such that the periphery 21a is partially uncovered and exposed through a corresponding one of openings 32b provided in the operating surface 32a of the spoke portion 32. The operating member 21 can be manipulated by moving the uncovered part of the periphery 21a with the tip of a finger. Referring to FIG. 7B, the periphery 21a of the operating member 21 is provided with multiple protrusions 21b extending parallel to the rotational axis O1. The protrusions 21b are disposed around the periphery 21a and function as slip stoppers.

The force-feedback input device of the second embodiment is not provided with the first switch 9 and the second switch 10 of the first embodiment. Instead of the first switch 9 and the second switch 10, a first button switch 22 and a second button switch 23 are provided in the spoke portion 32 of the steering wheel 30. The first button switch 22 and the second button switch 23 are arranged below each operating member 21 in the longitudinal direction of the drawing. The first button switch 22 and the second button switch 23 are connected to the controller 12, and when one of these button switches 22 and 23 is pressed, an ON signal is output to the controller 12.

In the second embodiment, the selection processes for the selectable items displayed in the first menu screen 15 and the second menu screen 16 and for the level bars 17a and AUTO 17b displayed in the third menu screen 17 shown in FIG. 6 are performed similar to the first embodiment. In other words, by rotating the operating member 21 and selecting one of the selectable items by pressing the first button switch 22, the first menu screen 15 switches to the second menu screen 16, or the second menu screen 16 switches to the third menu screen 17. On the other hand, by pressing the second button switch 23, the second menu screen 16 switches back to the first menu screen 15, or the third menu screen 17 switches back to the second menu screen 16.

The second embodiment has the following advantages.

Since each operating member 21 is housed in the spoke portion 32 of the steering wheel 30 such that the periphery 21a is partially uncovered and exposed through the corresponding opening 32b of the operating surface 32a, the operating member 21 can be manipulated by moving the uncovered part of the periphery 21a with the tip of a finger.

As a result, a less amount of operating force is required for the operating member 21, thus allowing use of a small motor 3 since only a small amount of torque is required for rotating the operating member 21. Like the first embodiment, the second embodiment allows the use of a small motor 3, thus contributing to the size reduction of the force-feedback input device. Furthermore, due to the size reduction, the force-feedback input device can be installed where there is only a small space provided, like the spoke portion 32 of the steering wheel 30.

What is claimed is:

1. A force-feedback input device comprising:
   a housing having an operating surface provided with an opening;
   an operating member whose periphery has an arc-shaped cross section, the operating member being rotatable about a rotational axis in a circumference direction of an arc;
   a motor which is capable of applying torque to the operating member;
   a rotational-angle detector for detecting the rotational angle of the operating member; and
   a controller for controlling the motor based on a rotational angle detected by the rotational-angle detector,
   wherein the operating member is housed in the housing such that the periphery of the operating member is partially uncovered and exposed through the opening of the operating surface, the operating member being rotatable about the rotational axis by manipulating the uncovered part of the periphery.

2. The force-feedback input device according to claim 1, wherein the operating member is tubular and at least a portion of the main body of the motor is disposed in the tubular operating member.

3. The force-feedback input device according to claim 2, further comprising:
   a rotary supporter which is disposed in the housing and tiltably supports the motor such that the motor can be tilted towards the opening of the operating surface;
   at least one switch which is disposed adjacent to the operating member across from the operating surface such that said at least one switch faces the operating member, said at least one switch being operated via the operating member when the operating member is tilted toward the housing; and
   a biasing element which constantly biases the operating member towards an exterior of the housing.

4. The force-feedback input device according to claim 3, wherein the rotary supporter includes a base which is fixed to the housing and is disposed adjacent to the operating member across from the operating surface such that the base faces the operating member, and a holder for supporting the motor, and
   wherein the base is provided with first rotary supporting portions and the holder is provided with second rotary supporting portions, the first rotary supporting portions being disposed adjacent to other two opposite sides of the operating member, the second rotary supporting portions being disposed adjacent to two opposite sides of the operating member, the second rotary supporting portions being supported by the first rotary supporting portions in a tiltable manner, whereby the holder is tiltably supported by the base.

5. The force-feedback input device according to claim 4, wherein the operating member is disposed between the first rotary supporting portions such that the first rotary supporting portions are aligned with the center line of the operating member extending perpendicular to the rotational axis, and the operating member is disposed between the second rotary supporting portions such that the second rotary supporting portions are aligned with a center line of the operating member extending perpendicular to the rotational axis, and
   wherein said at least one switch comprises a plurality of switches, said plurality of switches being disposed adjacent to two opposite ends of the operating member along the rotational-axis direction of the operating member.

6. The force-feedback input device according to claim 3, wherein the biasing element is included in said at least one switch, said at least one switch comprising an operating portion which is operated when the operating portion is pressed by the operating member, said at least one switch including a resilient member for allowing the pressed operating portion to return automatically to an original state, the resilient member functioning as the biasing element.

7. The force-feedback input device according to claim 1, wherein the motor comprises a shaft that connects the motor to the operating member.

8. The force-feedback input device according to claim 1, wherein the arc-shaped cross section of the operating member extends through the opening of the operating surface in a radial direction of the arc.

9. The force-feedback input device according to claim 1, wherein the motor is disposed within the operating member.

10. The force-feedback input device according to claim 1, wherein the rotational-angle detector is disposed within the housing.

11. The force-feedback input device according to claim 1, further comprising a switch disposed on the housing, the operating member disposed between the switch and the opening of the operating surface.

12. A force-feedback input device comprising:
   a housing having an operating surface provided with an opening;
   an operating member whose periphery has an arc-shaped cross section, the operating member being rotatable about a rotational axis in a circumference direction of an arc, the operating member housed in the housing such that the periphery of the operating member extends through the opening of the operating surface in a radial direction of the arc;
   a motor connected to the operating member through a shaft of the motor;
   a rotational-angle detector for detecting the rotational angle of the operating member; and
   a controller for controlling the motor based on a rotational angle detected by the rotational-angle detector.

13. The force-feedback input device according to claim 12, further comprising:
   a rotary supporter which is disposed in the housing and tiltably supports the motor such that the motor can be tilted towards the opening of the operating surface;
   at least one switch which is disposed adjacent to the operating member across from the operating surface such that said at least one switch faces the operating member, the at least one switch being operated via the operating member when the operating member is tilted toward the housing; and
   a biasing element which constantly biases the operating member towards an exterior of the housing.

14. The force-feedback input device according to claim 13, wherein the rotary supporter includes a base which is fixed to the housing and is disposed adjacent to the operating member across from the operating surface such that the base faces the operating member, and a holder for supporting the motor, and wherein the base is provided with first rotary supporting portions and the holder is provided with second rotary supporting portions, the first rotary supporting portions being disposed adjacent to other two opposite sides of the operating member, the second rotary supporting portions being disposed adjacent to two opposite sides of the operating member, the second rotary supporting portions being supported by the first rotary supporting portions in a tiltable manner, whereby the holder is tiltably supported by the base.

15. The force-feedback input device according to claim 14, wherein the operating member is disposed between the first rotary supporting portions such that the first rotary supporting portions are aligned with the center line of the operating member extending perpendicular to the rotational axis, and the operating member is disposed between the second rotary supporting portions such that the second rotary supporting portions are aligned with a center line of the operating member extending perpendicular to the rotational axis, and wherein said at least one switch comprises a plurality of switches, the plurality of switches being disposed adjacent to two opposite ends of the operating member along the rotational-axis direction of the operating member.

16. The force-feedback input device according to claim 12, wherein the rotational-angle detector is disposed within the housing.

17. A force-feedback input device comprising:

a housing having an operating surface provided with an opening;

an operating member whose periphery has an arc-shaped cross section, the operating member being rotatable about a rotational axis in a circumference direction of an arc, the operating member housed in the housing such that the periphery of the operating member extends through the opening of the operating surface in a radial direction of the arc;

a motor connected to the operating member through a shaft of the motor;

a rotational-angle detector for detecting the rotational angle of the operating member; and at least one switch disposed on the housing, the operating member disposed between the at least one switch and the opening of the operating surface.

18. The force-feedback input device according to claim 17, further comprising:

a rotary supporter which is disposed in the housing and tiltably supports the motor such that the motor can be tilted towards the opening of the operating surface; and a biasing element which constantly biases the operating member towards an exterior of the housing, the at least one switch being operated via the operating member when the operating member is tilted toward the housing.

19. The force-feedback input device according to claim 18, wherein the rotary supporter includes a base which is fixed to the housing and is disposed adjacent to the operating member across from the operating surface such that the base faces the operating member, and a holder for supporting the motor, and wherein the base is provided with first rotary supporting portions and the holder is provided with second rotary supporting portions, the first rotary supporting portions being disposed adjacent to other two opposite sides of the operating member, the second rotary supporting portions being disposed adjacent to two opposite sides of the operating member, the second rotary supporting portions being supported by the first rotary supporting portions in a tiltable manner, whereby the holder is tiltably supported by the base.

20. The force-feedback input device according to claim 19, wherein the operating member is disposed between the first rotary supporting portions such that the first rotary supporting portions are aligned with the center line of the operating member extending perpendicular to the rotational axis, and the operating member is disposed between the second rotary supporting portions such that the second rotary supporting portions are aligned with a center line of the operating member extending perpendicular to the rotational axis, and wherein said at least one switch comprises a plurality of switches, the plurality of switches being disposed adjacent to two opposite ends of the operating member along the rotational-axis direction of the operating member.

21. The force-feedback input device according to claim 17, wherein the arc-shaped cross section of the operating member extends through the opening of the operating surface in a radial direction of the arc.

22. The force-feedback input device according to claim 17, wherein the motor is disposed within the operating member.

23. The force-feedback input device according to claim 17, wherein the rotational-angle detector is disposed within the housing.

* * * * *